United States Patent Office 3,535,272
Patented Oct. 20, 1970

3,535,272
METHOD OF REDUCING HYDROCRACKING ACTIVITY DECLINE RATE OF CATALYST COMPRISING LAYERED CRYSTALLINE CLAY-TYPE ALUMINOSILICATE COMPONENT
James R. Kittrell, El Cerrito, and Richard F. Sullivan, Greenbrae, Calif., assignors to Chevron Research Company, San Francisco, Calif., a corporation of Delaware
No Drawing. Filed Feb. 5, 1969, Ser. No. 796,898
Int. Cl. C10g *13/04;* B01j *11/26*
U.S. Cl. 252—455
5 Claims

ABSTRACT OF THE DISCLOSURE

The method of treating a catalyst comprising a layered crystalline clay-type aluminosilicate component and at least one hydrogenating component in the oxide form, to reduce activity decline thereof during hydrocracking process operation, which comprises reducing said catalyst, reoxidizing said reduced catalyst, and reducing said re-oxidized catalyst.

INTRODUCTION

This application relates to hydrocarbon conversion catalysts comprising layered crystalline clay-type aluminosilicate components and to methods of reducing the activity decline rate of said catalysts during use of said catalysts for hydrocracking.

PRIOR ART

It is known, particularly from Granquist U.S. Pat. 3,252,757, that a relatively new layered crystalline aluminosilicate clay-type mineral that has been synthesized has the empirical formula

$$nSiO_2:Al_2O_3:mAB:xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\tfrac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A divalent, and to a value intermediate between 12.0 A. and 14.7 A. when A includes both monovalent and divalent cations.

Said layered synthetic clay-type crystalline aluminosilicate mineral (hereinafter included in the term "layered clay-type crystalline aluminosilicate" and in the term, used for brevity, "layered aluminosilicate," which terms are intended to include any other catalytically active layered clay-type crystalline aluminosilicate, whether synthetic or natural) is known from U.S. Pat. 3,252,889 to have application in calcined form as a component of a catalytic cracking catalyst, and applications of said layered aluminosilicate in calcined form as a component of a hydrocracking catalyst have been disclosed in the copending application of Sigmund M. Csicsery and Joseph Jaffe, Ser. No. 752,538, filed Aug. 14, 1968, in the copending application of Joseph Jaffe, Ser. No. 750,038, filed Aug. 5, 1968, and in the copending application of Sigmund M. Csicsery, Donald A. Hickson and Joseph Jaffe Ser. No. 760,676, filed Sept. 18, 1968.

In said application Ser. No. 760,676, there is provided a method of activating a hydrocarbon conversion catalyst comprising a layered crystalline clay-type aluminosilicate component and a hydrogenating component, especially a hydrogenating component selected from rhenium and compounds thereof and Group VIII metals and compounds thereof, which comprises heating said catalyst, preferably in a stream of air or other oxygen-containing gas, at 900° to 1150° F. for 0.5 to 20 hours. In the method of said application Ser. No. 760,676, catalyst activation within the given temperature range-time range combination of conditions provides greater catalyst hydrocracking activity, and provides greater catalyst hydrocracking stability, than does catalyst activation at conditions outside the given combination. However, there remains incentive for further increasing stability of a catalyst comprising a layered crystalline clay-type aluminosilicate, that is, for reducing the hydrocracking activity decline of the catalyst in hydrocracking service, even if previously it has been activated according to said method of application Ser. No. 760,676.

OBJECTS

In view of the foregoing, it is an object of the present invention to provide an improved method for reducing the hydrocracking activity decline in hydrocracking service of a catalyst comprising a layered crystalline clay-type aluminosilicate component and at least one hydrogenating component.

STATEMENT OF INVENTION

In accordance with the present invention there is provided the method of treating a catalyst comprising a layered crystalline clay-type aluminosilicate component and at least one hydrogenating component in the metal oxide form to reduce the actvity decline rate thereof during hydrocracking process operation, which comprises, in sequence:

(a) Subjecting said catalyst comprising said hydrogenating component in the metal oxide form to reducing conditions, including a temperature of 450° to 1300° F. until a major portion of said hydrogenating component has been converted to the metal form;

(b) Subjecting said catalyst to oxidizing conditions, including a temperature of 50° to 1300° F., preferably 50° to 350° F., more preferably 50° to 250° F., until a major portion of said hydrogenating component again is in the oxide form;

(c) Subjecting said catalyst to reducing conditions, including a temperature of 450° to 1300° F., until a major portion of said hydrogenating component again is in the metal form.

While we do not intend to be bound by any theory explaining the improved results obtainable by use of the present invention, it is believed that the catalyst treating method of the invention accomplishes a redistribution of the metal or metals of the hydrogenating component or components of the catalyst, and that this redistribution results in a reduction in catalyst fouling rate.

Further in accordance with the present invention, it has been found that improved results are obtained if prior to completion of the first reduction step the catalyst is contacted with a heat-generating substance which is absorbed on the catalyst. This heat-generating substance may be a hydrocarbon, for example a conventional hydrocracking feedstock, or may be sulfur or a sulfur-containing compound such as dimethyldisulfide or hydrogen sulfide. It is believed that the heat-generating substance causes intense heat to be generated near the active catalyst sites during the reduction-oxidation-reduction steps, and facilitates redistribution of the metal or metal-containing hydrogenating component or components.

Further in accordance with the present invention, the catalyst may be sulfided in a conventional manner prior to being used in hydrocracking service, for example by being contacted with hydrogen sulfide or dimethyldisulfide. Alternatively, or in addition, the catalyst may be sulfided during hydrocracking process operation, from sulfur compounds present in the hydrocarbon feed.

Further in accordance with the present invention, there is provided a hydrocracking process which comprises hydrocracking a hydrocarbon feedstock in a hydrocracking zone at a temperature of 400° to 900° F., a pressure of 1000 to 3500 p.s.i.g., a liquid hourly space velocity of 0.3 to 5.0, and a hydrogen supply rate of at least 500 s.c.f. of hydrogen per barrel of said feedstock, in the presence of a catalyst comprising a layered crystalline clay-type aluminosilicate component and at least one hydrogenating component, said catalyst having been treated by the catalyst treating method of the present invention.

Further in accordance with the present invention, improved results are obtained—that is, the catalyst stability is further improved—if during hydrocracking process operation using a catalyst comprising a layered crystalline clay-type aluminosilicate component and at least one hydrogenating component, at least a portion of the liquid effluent from the hydrocracking zone is recycled thereto.

Unusually good results are obtained in the catalyst treating method of the present invention when the catalyst comprising a layered crystalline clay-type aluminosilicate also comprises, at the time it is used for hydrocracking, a hydrogenating component selected from rhenium and compounds thereof, Group VIII metals and compounds thereof, and combinations of Group VI and Group VIII metals and compounds thereof.

REDUCTION AND OXIDATION STEPS

The reduction steps in the catalyst treating method of the present invention may be accomplished by contacting the catalyst with a reducing gas, for example hydrogen. The reduction temperature must be at least 450° F. for adequately improved catalyst stability to be obtained. The reduction temperature cannot exceed 1300° F. without adversely affecting the crystal structure of the catalyst. The reduction treatment is continued until a major portion of the hydrogenating component or components is in the metal form. As an example, the amount of reduction that should be accomplished must exceed that which would be accomplished under the following conditions:

Pressure: Atmospheric
Temperature: 400° F.
Time: 0.25 hour
Hydrogen: Pure and dry That is, the reduction must result in a major portion of the hydrogenating component or components being in the metal form. With the foregoing information as a guide, those skilled in the art will be able to select reducing gases and conditions adequate to practice the catalyst treating method of the invention.

The oxidation step in the catalyst treating method of the present invention may be accomplished by contacting the catalyst with an oxidizing gas, for example air or other oxygen-containing gas. The oxidation temperature must be 50° to 1300° F., preferably 50° to 350° F., and more preferably 50° to 250° F., for adequately improved catalyst stability to be obtained. The oxidation temperature should not be below 50° F., because a lower temperature is unnecessary and provides an unnecessarily low rate of oxidation. The oxidation temperature cannot be above 1300° F. without adversely affecting the crystal structure of the catalyst.

HYDROCRACKING ZONE REACTION CONDITIONS

The hydrocracking zone containing a catalyst comprising a layered clay-type synthetic aluminosilicate treated pursuant to the catalyst treating method of the present invention may be operated at a temperature of 400° to 900° F., a pressure of 1000 to 3500 p.s.i.g., a liquid hourly space velocity of 0.3 to 5.0, and a hydrogen supply rate of at least 500 s.c.f. of hydrogen per barrel of hydrocarbon feedstock.

EXAMPLES

The following examples will serve to aid in further understanding the method of the present invention, but are not intended to limit the scope of the invention.

EXAMPLE 1

A layered aluminosilicate-palladium-rhenium catalyst (catalyst A) was prepared in the following manner.

These starting materials were used:

(1) 500 grams of a layered clay-type aluminosilicate in finely divided form.

(2) 6.8 grames of tetra ammino palladium nitrate $[Pd(NH_3)_4](NO_3)_2$, dissolved in 700 ml. of $H_2O$.

The layered aluminosilicate in powder form was mixed with the tetra ammino palladium nitrate solution, to form a pasty mass. The pasty mass was dried in a vacuum oven for 6 hours at room temperature, then at 200°–250° F. for approximately 16 hours. The resulting material was crushed, and then calcined in flowing dry air for 4 hours at 400° F., then for 5 hours at 950° F. The resulting catalyst upon analysis was found to contain 0.5 weight percent palladium, calculated as metal. This catalyst was then impregnated with rhenium by soaking said catalyst for 15 minutes in 100 cc. of solution containing 2.47 g. of rhenium, added as perrhenic acid. The excess solution was drained, the catalyst was dried for 2 hours at 250° F. and was activated in flowing air at 950° F. for 2 hours. The resulting catalyst thus contained about 0.5% palladium and 0.5% rhenium.

EXAMPLE 2

A second catalyst (catalyst B) was prepared by the same techniques as Example 1, except the palladium and rhenium were added simultaneously to provide a coimpregnated catalyst containing 0.5% palladium and 0.5% rhenium.

EXAMPLE 3

Catalyst B, treated as described above, was used to hydrocrack, in a run referred to below as Test 1, a portion of a light catalytic cycle oil feedstock of the following description:

| | |
|---|---|
| Gravity, ° API | 30.1 |
| Aniline Point, ° F. | 132 |
| Sulfur content, p.p.m. | 5 |
| Nitrogen content, p.p.m. | 0.3 |
| ASTM D–1160 distillation: | |
| ST/5 | 409/446 |
| 10/30 | 460/486 |
| 50 | 523 |
| 70/90 | 572/632 |
| 95/EP | 673/732 |

The hydrocracking was accomplished, on a once-through liquid basis, at a pressure of 1200 p.s.i.g., a liquid hourly space velocity of 0.9, a conversion of 60 liquid volume percent below 400° F., and a hydrogen supply rate of approximately 7000 s.c.f./bbl.

Catalyst B of Example 2 was subjected to a reduction in hydrogen for approximately one-half hour at temperatures ranging from about 70° F. to 400° F. The catalyst was then contacted with the hydrocarbon feed described below at 400° F. for 2 hours and then at 450° F. for 1 hour.

Following test 1, catalyst B was removed from hydrocarbon service, oxidized by passing air over the catalyst at 0.5 cu. ft./hr. for 24 hours, and then reduced with flowing hydrogen at temperatures up to 450° F.

Catalyst B then was used to hydrocrack once-through another portion of the feedstock used in Test 1, at the conditions given for Test 1, in a run referred to below as Test 2.

Following Test 2, a distillation column was added to the pilot plant and all product boiling above 400° F. was recycled to the reactor inlet. Catalyst B was then used with this recycle arrangement to hydrocrack another portion of the feedstock used in Test 1, at the conditions given for Test 1, in a run referred to below as Test 3.

The results of these tests are tabulated below:

|  | Catalyst B | | |
|---|---|---|---|
|  | Test 1 | Test 2 | Test 3 |
|  | (Once-through) | | (Recycle) |
| Catalyst activity (starting temperature, ° F.) | 500 | [1] 500 | [1] [2] 535 |
| Fouling Rate, ° F./hr | .12 | 0.045 | <0.01 |

[1] Extrapolated.
[2] This activity is believed to be low due to catalyst contamination from a dirty distillation column.

The dramatic effect of the catalyst pretreatment method of the present application is apparent, as is the beneficial effect of recycle liquid operation on the catalyst system.

EXAMPLE 4

Catalyst A of Example 1 was used to hydrocrack another portion of the feedstock used in Test 1, at the conditions given for Test 1, in a run referred to below as Test 4.

Following Test 4, the catalyst was subjected to oxygen exposure for 24 hours and reduced at temperatures up to 450° F.

The catalyst, so oxidized and reduced, was then used to hydrocrack another portion of the feedstock used in Test 1, at the conditions given for Test 1, in a run referred to below as Test 5.

The results of these tests are tabulated below:

|  | Catalyst A | |
|---|---|---|
|  | Test 4 | Test 5 |
| Catalyst activity (starting temperature, ° F.) | 537 | 518 |
| Fouling rate, ° F./hr | 0.15 | 0.036 |

EXAMPLE 5

The 180°–400° F. portion of the product of Example 3, resulting from use of catalyst B, is catalytically reformed, using a conventional reforming catalyst and conventional reforming conditions, and is found to be a superior feedstock for this operation. The catalytic reformate is combined with the $C_5$—180° F. portion of the product of Example 3, to produce a gasoline pool.

EXAMPLE 6

The 400° F.+ portion of the product of Example 3, resulting from use of catalyst B, is recycled to the catalytic cracking unit which produced the light cycle oil feed used in Example 3. This upgrades the total feed to the catalytic cracking unit, and causes decreased coke production and increased gasoline production in that unit. These improved results are made possible because of the improved characteristics of the 400° F.+ materials recycled from the hydrocracking zone to the catalytic cracking unit, compared with the approximately 400° F.+ light cycle oil supplied to the hydrocracking zone from the catalytic cracking unit.

Although only specific embodiments of the present invention have been described, numerous variations can be made in these embodiments without departing from the spirit of the invention, and all such variations that fall within the scope of the appended claims are intended to be embraced thereby.

What is claimed is:

1. The method of treating a catalyst comprising a layered crystalline clay-type aluminosilicate component and at least one hydrogenating component in the metal oxide form to reduce the activity decline rate thereof during hydrocracking process operation, which comprises, in sequence:

(a) subjecting said catalyst comprising said hydrogenating component in the metal oxide form to reducing conditions, including a temperature of 450° to 1300° F. until a major portion of said hydrogenating component has been converted to the metal form;

(b) subjecting said catalyst to oxidizing conditions, including a temperature of 50° to 1300° F., until a major portion of said hydrogenating component again is in the oxide form;

(c) subjecting said catalyst to reducing conditions, including a temperature of 450° to 1300° F., until a major portion of said hydrogenating component again is in the metal form;

said layered crystalline clay-type aluminosilicate component having, prior to calcination of said catalyst, the empirical formula $$nSiO_2:Al_2O_3:mAB:xH_2O$$

where the layer lattices comprise said silica, said alumina, and said B, and where $n$ is from 2.4 to 3.0
   $m$ is from 0.2 to 0.6
   A is one equivalent of an exchangeable cation having a valence not greater than 2, and is external to the lattice,
   B is chosen from the group of negative ions which consists of $F^-$, $OH^-$, $\tfrac{1}{2}O^{--}$ and mixtures thereof, and is internal in the lattice, and
   $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

2. The method as in claim 1, wherein prior to completion of step (a) said catalyst is contacted with a heat-generating substance which is adsorbed on said catalyst.

3. The method as in claim 2, wherein said substance is a hydrocarbon.

4. The method as in claim 2, wherein said substance comprises sulfur.

5. The method as in claim 1, wherein said catalyst is sulfided following step (c).

References Cited

UNITED STATES PATENTS 3,211,642  10/1965  Unverferth _____ 208—111
3,252,757  5/1966  Granquist _____ 208—120

DELBERT E. GANTZ, Primary Examiner

A. RIMENS, Assistant Examiner

U.S. Cl. X.R.

252—416, 450; 208—111, 120